(12) United States Patent
Li et al.

(10) Patent No.: US 7,180,220 B2
(45) Date of Patent: Feb. 20, 2007

(54) MOTOR CARBON BRUSH ASSEMBLY

(75) Inventors: Ke-Hsien Li, Taichung (TW); Meng-Chiu Yu, Taichung (TW)

(73) Assignee: Taiwan Long Hawn Enterprise Co., Taichung (TW)

( * ) Notice: Subject to any disclaimer, the term of this patent is extended or adjusted under 35 U.S.C. 154(b) by 117 days.

(21) Appl. No.: 11/111,712

(22) Filed: Apr. 22, 2005

(65) Prior Publication Data
US 2006/0145564 A1   Jul. 6, 2006

(30) Foreign Application Priority Data
Jan. 6, 2005   (TW) .............................. 94100409 A

(51) Int. Cl.
H01R 39/38 (2006.01)
H01R 39/39 (2006.01)
H01R 39/40 (2006.01)
H02K 5/14 (2006.01)
H02K 5/22 (2006.01)

(52) U.S. Cl. ...................................... 310/249; 310/242
(58) Field of Classification Search ................ 310/239, 310/242, 248, 249, 71
See application file for complete search history.

(56) References Cited
U.S. PATENT DOCUMENTS

| 2,695,968 | A | * | 11/1954 | Welch et al. ................ 310/246 |
| 3,445,705 | A | * | 5/1969 | Irwin et al. .................. 310/247 |
| 3,842,302 | A | * | 10/1974 | Apostoleris .................. 310/239 |
| 5,235,230 | A | * | 8/1993 | Yuhi et al. ..................... 310/71 |
| 5,387,832 | A | * | 2/1995 | Tanaka et al. ............... 310/249 |
| 5,481,150 | A | * | 1/1996 | Tanaka et al. ............... 310/249 |
| 5,621,262 | A |   | 4/1997 | Han |
| 6,011,341 | A | * | 1/2000 | Toya et al. .................. 310/239 |
| 6,731,042 | B1 | * | 5/2004 | Bank et al. .................. 310/239 |
| 6,917,135 | B1 | * | 7/2005 | Yu .............................. 310/239 |

* cited by examiner

Primary Examiner—Tran Nguyen
(74) Attorney, Agent, or Firm—Bacon & Thomas, PLLC

(57) ABSTRACT

A motor carbon brush assembly is composed of an insulated holder, a first electrically conductive member, a resilient member, a second electrically conductive member, a carbon brush, a spring, and a rear cover. The resilient member includes a contact portion elastically deformable under pressure. The first conductive member and the resilient member are mounted respectively to the insulated holder. The second conductive member is held between the contact portion of the resilient member and the first conductive member to enable the first conductive member to be electrically connected with the second conductive member. The spring is connected with the carbon brush and the second conductive member. The second conductive member is held tight between the first conductive member and the resilient member to avoid disengagement from and imperfect contact with the first conductive member.

8 Claims, 3 Drawing Sheets

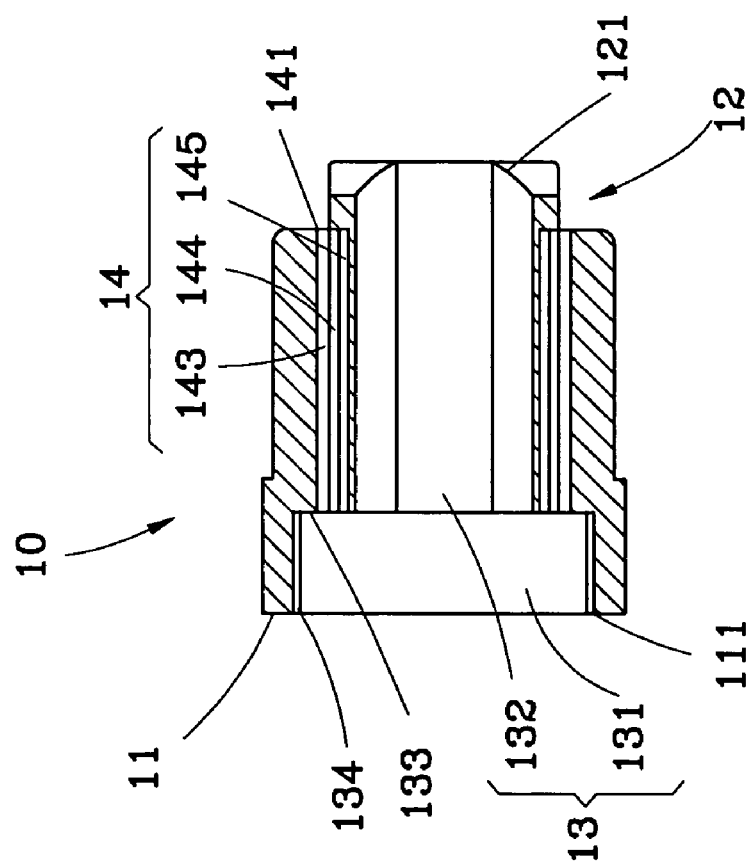
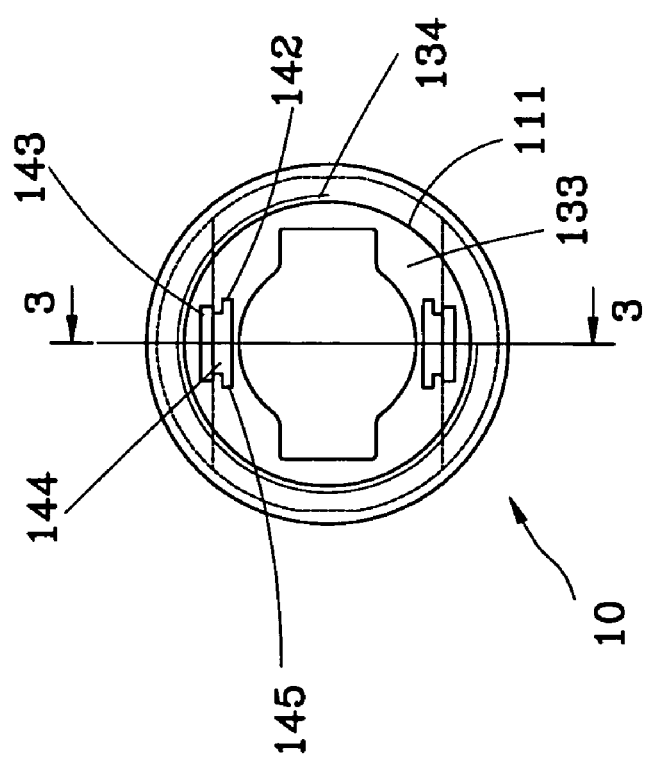

MOTOR CARBON BRUSH ASSEMBLY

BACKGROUND OF THE INVENTION

1. Field of the Invention

The present invention relates generally to motors, and more particularly, to a motor carbon brush assembly.

2. Description of the Related Art

A conventional motor carbon brush assembly is composed of an electrically conductive cooper sleeve, an insulated holder covering an external side of the cooper sleeve, a spring mounted in the cooper sleeve, and a carbon brush mounted in the cooper sleeve. The carbon brush is biased by the spring to have its external end contact against a rotor of a motor, being electrically connected with a power source through the cooper sleeve for transmitting electric current to the rotor. Because the carbon brush causes wear and tear by its friction with the rotor, the spring is provided for pushing the carbon brush to move and keeping close contact between the carbon brush and the rotor. During the operation of the motor, however, the carbon brush would be moved slowly in the cooper sleeve. In other words, it causes friction between the carbon brush and the cooper sleeve to produce arcs, sparkles and high heat, thus shortening the longevity of the carbon brush.

To improve the above drawback of the conventional carbon brush assembly, a carbon brush holder as disclosed in U.S. Pat. No. 5,621,262 was developed, including a holder body, a plastic cap, a lead terminal, and a brush terminal. The holder body has a receiving part at its center, two lead slots respectively located at two opposite side of its sidewall, a fitting part provided at an end of the holder body, and a mounting step provided between the fitting part and the receiving part. The lead terminal is made of metal, having a hanger portion hung on the mounting step, and a tab extending downwards from the hanger portion and located in the lead slot and having a bottom section running through the holder body for curvature of 90 degree. The carbon brush is made of metal and covered on the hanger portion of the lead terminal. The plastic cap is mounted on the fitting part of the holder body for pressing the carbon brush to fasten the carbon brush and the lead terminal onto the holder body. A carbon brush is located in the two brush slots and is connected with the carbon terminal and the carbon brush through a spring and a flexible cooper conductor.

As indicated above, supply the tab with a power source to enable the electric current to flow through the lead terminal, the carbon brush, the cooper conductor, spring, the carbon brush, and finally the rotor by contact conduction. Because it causes none of friction between the carbon brush and the cooper sleeve in such carbon brush holder as the conventional carbon brush assembly causes, none of the arc, sparkles, and high heat would occur.

However, such carbon brush holder is still defective. While the motor starts operation, vibration will occur to cause the plastic cap mounted on the holder body to gradually slip off the holder body, leaving the brush terminal close to the hanger portion of the lead terminal no longer. Thus, the arcs, sparkles, and high heat will be produced between the brush terminal and the lead terminal to worsely cause imperfect or malfunctioned conduction between the carbon brush holder and the rotator of the motor.

SUMMARY OF THE INVENTION

The primary objective of the present invention is to provide an improved motor carbon brush assembly, which prevents its internal parts from unsettlement during the operation of the motor.

The foregoing objective of the present invention is attained by the motor carbon brush assembly, which is composed of an insulated holder, a first electrically conductive member, a resilient member, a second electrically conductive member, a carbon brush, a spring, and a rear cover. The resilient member includes a contact portion which is elastically deformable under pressure. The first conductive member and the resilient member are mounted respectively on the insulated holder, having a part of the first conductive member and the resilient member located respectively in through holes of the insulated holder. The second conductive member includes a body and at least one insert portion extending from the body. The insert portion is inserted into the through hole and held between the contact portion of the resilient member and the first conductive member to enable the first conductive member to be electrically connected with the second conductive member. The spring is connected with the carbon brush and the body of the second conductive member, such that while electric current flows into the first conductive member, the current can in turn flow through the first and second conductive members, the spring, and the carbon brush. The second conductive member is held tight between the first conductive member and the resilient member to avoid disengagement from and imperfect contact with the first conductive member.

BRIEF DESCRIPTION OF THE DRAWINGS

FIG. 2 is a rear view of the insulated holder in accordance with the preferred embodiment of the present invention.

FIG. 3 is a sectional view taken from a line 3—3 indicated in FIG. 2.

DETAILED DESCRIPTION OF PREFERRED EMBODIMENTS

Figure 1:
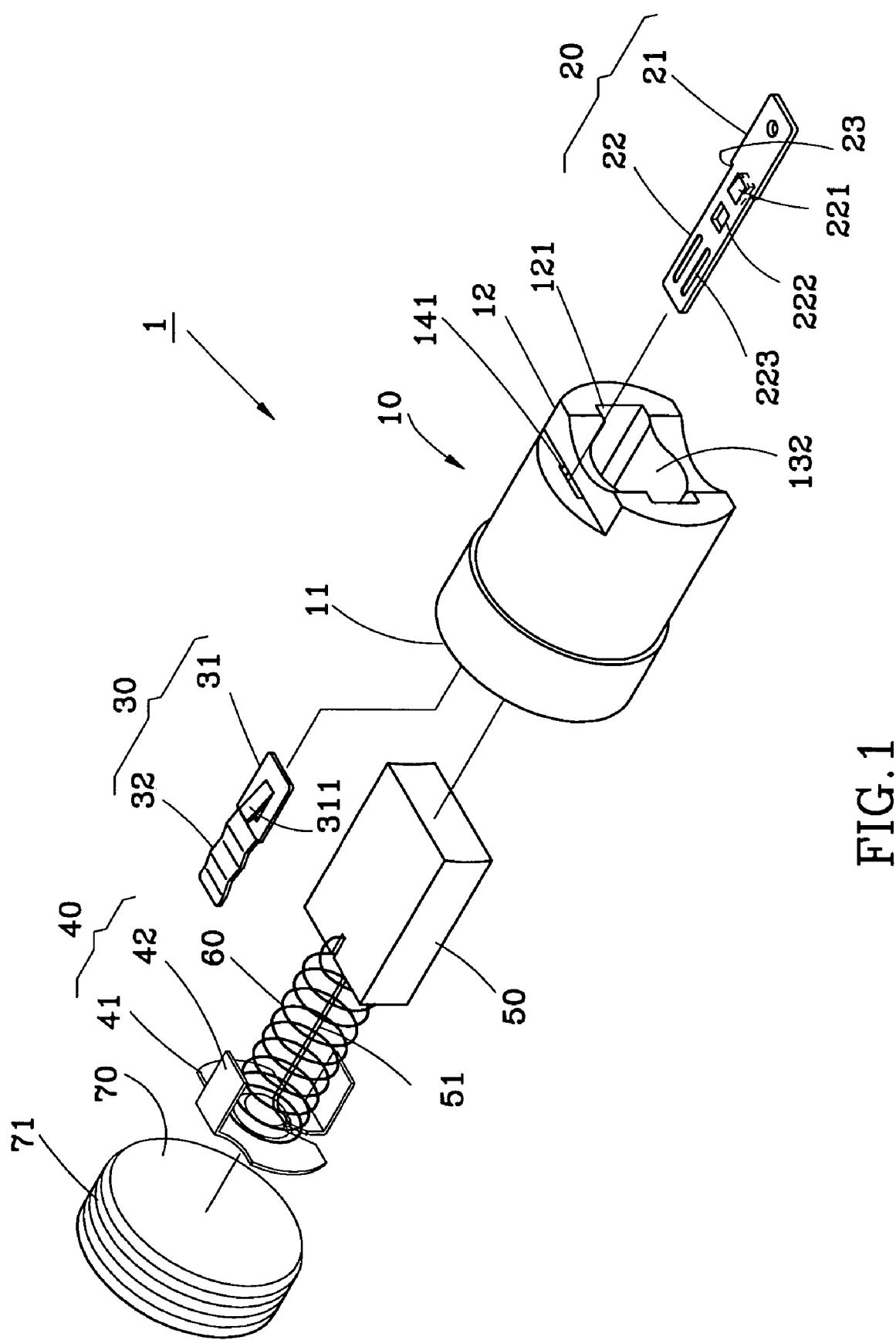
FIG. 1 is an exploded view of a preferred embodiment of the present invention.

Referring to FIGS. 1–4, a motor carbon brush assembly 1 constructed according to a preferred embodiment of the present invention is composed of an insulated holder 10, a first electrically conductive member 20, a resilient member 30, a second electrically conductive member 40, a carbon brush 50, a spring 60, and a rear cover 70.

The insulated holder 10 includes a first distal portion 11 at an end thereof, a second distal portion 12 at the other end thereof, a first through hole 13, and two second through holes 14. The first through hole 13 has a first section 131 defining an opening 111 at the first distal portion 11, a second section 132 abutting the first section 131 and defining an opening 121 at the second distal portion 12, and a stepped portion 133 located between the first and second sections 131 and 132. The second section 132 is smaller in diameter than the first section 131. An internal thread 134 is provided on a sidewall of the first section 131. The two second through holes 14 are located respectively at two opposite sides of the second section 132, running respectively through the second distal portion 13 and the stepped portion 133 to define a first opening 141 and a second opening 142 respectively at the second distal portion 12 and the stepped portion 133. Each of the second through holes 14 is formed of three receiving tunnels, which are defined as a first tunnel 143, a second tunnel 144 abutting and communicating with the first tunnel 143, and a third tunnel 145 abutting and communicating with the second tunnel 144. The second tunnel 144 is smaller in width than either of the first and third tunnels 143 and 145, such that the second through hole 14 is I-shaped, as shown in FIG. 2. Among the three receiving tunnels 143, 144, and 145, the third tunnel 145 is the closest one to the second section 132.

Figure 4:
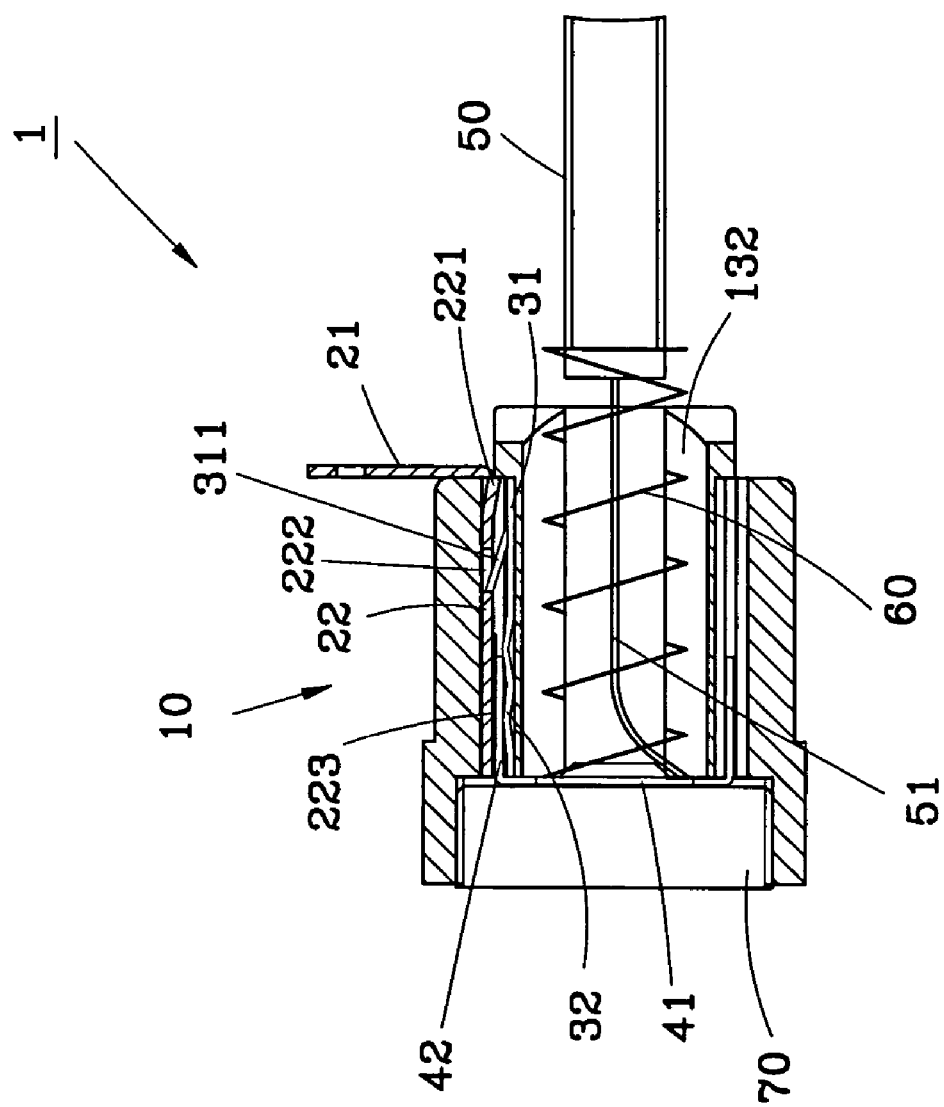
FIG. 4 is a sectional view of the preferred embodiment of the present invention.

The first conductive member 20 is made of copper and elongated, having a first portion 21 and a second portion 22. The second portion 22 is smaller in width than the first portion 21 to define two retaining portions 23 between the first and second portions 21 and 22. A retaining piece 221, a wedge slot 222, and two elongated convexities 223 protruding downwards are formed by stamping on the second portion 22 and are arranged in turn on the second portion 22 by the distance from the first portion 21. The retaining piece 221 is located between the first and second portions 21 and 22, leaning downwards and extending towards the first portion 21. The second portion 22 of the first conductive member 20 is inserted from the first opening 141 into the first tunnel 143 to enable the first portion 21 and the retaining portions 23 to contact against a sidewall of the first opening 141 and to enable the retaining piece 221 to contact against a sidewall of the second through hole 14. Thus, the first conductive member 20 is fixed on the insulated holder 10. The first and second portions 21 and 22 are located respectively outside the insulated holder 10 and inside the second through hole 14, as shown in FIG. 4.

The resilient member 30 is made of metal, having a body portion 31 and a contact portion 32. The body portion 31 has a turnup wedge piece 311 provided thereon by stamping. The contact portion 32 is smaller in width than the body portion 31 and snakelike to be elastically deformable under pressure. The resilient member 30 is inserted into the wedge hole 222 to wedge the first conductive member 20 and to enable the body portion 31 to be located in the third tunnel 145 and to enable the contact portion 32 to be located between the second and third tunnels 144 and 145.

The second conductive member 40 is made of copper, having a body 41 and two insert portions 42 extending outwards from the body 41. The two insert portions 42 are inserted respectively from the second openings 142 of the two second through holes 14 into the two second tunnels 144 to be held between the convexities 223 of the first conductive member 20 and the contact portion 32 of the resilient member 30. The body 41 is located in the first section 131 of the first through hole 13.

The carbon brush 50 is located in the second section 132 of the first through hole 13, having a lead wire 51 electrically connected with the second conductive member 40.

The spring 60 has two ends connected respectively with the carbon brush 50 and the second conductive member 40.

The rear cover 70 is a circular cover member, having an external thread 71 on an outer periphery thereof. The external thread 71 can be threadedly fitted with the internal thread 134 of the first section 131 to interconnect the rear cover 70 and the first section 131 together and to enable the rear cover to press against the second conductive member 40.

As recited above, supply the first conductive member 20 with electric current to enable the current to flow in turn through the first and second conductive members 20 and 40, the spring 60, the lead wire 51, and finally the carbon brush 50. While the carbon brush 50 contacts a rotor of a motor, the current flows to the rotor.

Because the second conductive member 40 is held tight between the first conductive member 20 and the resilient member 30, even if the second conductive member 70 is disengaged from the insulated holder 10 by vibration, the second conductive member 40 will not be disengaged from and rendered imperfect contact with the first conductive member 20 by the vibration.

What is claimed is:

1. A motor carbon brush comprising:
   an insulated holder having a first distal portion, a second distal portion, a first through hole, and at least one second through hole, said first through hole having a first section and a second section, said first section defining an opening at said first distal portion, said second section abutting said first section and being smaller in diameter than said first section, a stepped portion being provided between said first and second sections, said second through hole running through said second distal portion and said stepped portion to define a first opening and a second opening respectively at said second distal portion and said stepped portion;
   an elongated first electrically conductive member made of electrically conductive material and having a first potion and a second portion, said first conductive member being fixed on said insulated holder, said second portion being located in said second through hole, said first portion running out of said first opening and located outside said second through hole;
   a resilient member mounted in said second through hole and having at least one contact portion for elastic deformation under pressure;
   a second electrically conductive member made of electrically conductive material and having a body and at least one insert portion extending outwards from said body, said insert portion being inserted from said second opening into said second through hole and held between said second portion of said first conductive member and said resilient member, said body being located in said first section of said first through hole;
   a carbon brush located in said second section of said first through hole;
   a spring connected respectively with said carbon brush and said second conductive member; and
   a rear cover connected with said first section of said first through hole and pressing against said second conductive member.

2. The motor carbon brush as defined in claim 1, wherein said insulated holder further comprises a second through holes, said two second through holes being located respectively at two opposite sides of said first through hole.

3. The motor carbon brush as defined in claim 2, wherein each of said second through holes is formed of three receiving tunnels defined as a first tunnel, a second tunnel abutting and communicating with said first tunnel, and a third tunnel abutting and communicating with said second tunnel, said second tunnel being smaller in width than either of said first and third tunnels to enable said second through hole to be I-shaped, said third tunnel being the closest one to said second section of said second distal portion among said three receiving tunnels; said second portion of said first conductive member is located in said first tunnel; said resilient member further comprises a body portion connected with said contact portion, said body portion being located in said third tunnel, said contact portion being located in said second and third tunnels; said second through hole being two in number; said second conductive member further comprises an insert portion, said two insert portion being inserted respectively from said two second openings of said second through holes into said second tunnels and held between said second portion of said first conductive member and said contact portion of said resilient member.

4. The motor carbon brush as defined in claim 1, wherein said second portion of said first conductive member is smaller in width than said first portion to define two retaining portions between said first and second portions, said second portion having a retaining piece formed by stamping, whereby said first conductive member is fixedly mounted on said insulated body by that said second portion is inserted from said first opening into said first through hole to enable said retaining portion to contact against a sidewall of said first opening and to enable said retaining piece to contact against a sidewall of said second through hole.

5. The motor carbon brush as defined in claim 1, wherein said first conductive member further comprises a wedge slot at said second portion; said resilient member further comprises a turnup wedge piece formed by stamping, said resilient member being inserted from said second opening into said second through hole to enable said wedge piece to extend into said wedge hole of said first conductive member to wedge said first conductive member.

6. The motor carbon brush as defined in claim 1, wherein said first conductive member comprises two elongated convexities formed by stamping and parallel protruding outwards; said insert portions of said second conductive member are held between said contact portion of said resilient member and said elongated convexities of said first conductive member.

7. The motor carbon brush as defined in claim 1, wherein said contact portion of said resilient member is snakelike.

8. The motor carbon brush as defined in claim 1, wherein said first section of said first through hole comprises an external thread provided on a sidewall thereof; said rear cover is a circular cover member comprising an external thread provided on a periphery thereof, said external thread being fitted with said internal thread of said first section to interconnect said rear cover and said first section.

* * * * *